(12) United States Patent
Chen et al.

(10) Patent No.: US 10,987,540 B2
(45) Date of Patent: Apr. 27, 2021

(54) TWO-WAY TRANSMISSION MECHANISM FOR FITNESS EQUIPMENT

(71) Applicant: CHANG YOW TECHNOLOGIES INTERNATIONAL CO., LTD., Taichung (TW)

(72) Inventors: Chao-Chuan Chen, Taichung (TW); Chung-Hsien Wang, Taoyuan (TW); Wei-Ting Liao, Taichung (TW); Chih-Tai Liu, Taichung (TW)

(73) Assignee: CHANG YOW TECHNOLOGIES INTERNATIONAL CO., LTD., Taichung (TW)

( * ) Notice: Subject to any disclaimer, the term of this patent is extended or adjusted under 35 U.S.C. 154(b) by 56 days.

(21) Appl. No.: 16/409,518

(22) Filed: May 10, 2019

(65) Prior Publication Data
US 2020/0222752 A1    Jul. 16, 2020

(30) Foreign Application Priority Data
Jan. 16, 2019    (TW) ................................. 108101706

(51) Int. Cl.
*A63B 22/06* (2006.01)
*B62M 6/40* (2010.01)

(52) U.S. Cl.
CPC ........... *A63B 22/0605* (2013.01); *B62M 6/40* (2013.01)

(58) Field of Classification Search
CPC ........ A63B 22/0605; A63B 2022/0611; A63B 2022/0635; A63B 2022/0641; A63B 2022/0647; A63B 2022/0652; A63B 2022/0668; A63B 22/0664; A63B 22/20; A63B 22/0076; A63B 22/06; A63B 22/18; A63B 22/0611; F16D 41/24; B62M 6/40; B62M 9/00
USPC ....................................................... 474/84, 88
See application file for complete search history.

(56) References Cited

U.S. PATENT DOCUMENTS

| | | | |
|---|---|---|---|
| 4,986,533 A * | 1/1991 | Lo ......................... | A63B 22/001 482/62 |
| 5,071,117 A * | 12/1991 | Mautner ............ | A63B 22/0007 482/57 |
| 6,234,939 B1 * | 5/2001 | Moser ................ | A63B 22/0007 482/57 |
| 2004/0130228 A1 * | 7/2004 | Chang ..................... | F16D 27/01 310/103 |

* cited by examiner

*Primary Examiner* — Nyca T Nguyen
*Assistant Examiner* — Andrew M Kobylarz
(74) *Attorney, Agent, or Firm* — Muncy, Geissler, Olds & Lowe, P.C.

(57) ABSTRACT

A two-way transmission mechanism for fitness equipment includes a first transmission wheel mounted at a crankshaft and connected to a first relay wheel by a first transmission belt, a second transmission wheel connected to a second relay wheel by a second transmission belt, a transmission shaft connecting the first and second relay wheels, a one-way ratchet mounted between the first relay wheel and the transmission shaft for power transmission therebetween in one direction, and a motor having a motor shaft connected with the second transmission wheel.

9 Claims, 11 Drawing Sheets

TWO-WAY TRANSMISSION MECHANISM FOR FITNESS EQUIPMENT

BACKGROUND OF THE INVENTION

1. Field of the Invention

The present invention relates to fitness equipment transmission mechanism technology and more particularly, to a two-way transmission mechanism that can be switched between a manual drive mode and an electric drive mode.

2. Description of the Related Art

Generally, a human-powered exercise bike is operated by the user's feet in pedaling two pedals so that the pedals drive the flywheel to rotate through the transmission mechanism, thereby allowing the user to simulate the state of riding a bicycle to achieve the fitness effect. There is also an electric-powered exercise bike that uses a motor to drive the pedals, allowing the feet of the user to move with the pedals so that the user's feet can be exercised.

However, the above-described two types of exercise bikes are designed as independent functions. If you want to use the above two different modes for training, you need to purchase two different exercise bikes at the same time, which will not only increase the purchase cost but also occupy more space.

SUMMARY OF THE INVENTION

The present invention has been accomplished under the circumstances in view. It is the main object of the present invention to provide a two-way transmission mechanism for fitness equipment, which integrates the manual drive mode and the electric drive mode, so that the user can switch between two different modes according to actual needs to achieve different training effects.

To achieve this and other objects of the present invention, a two-way transmission mechanism comprises a crank unit, a transmission unit, a one-way ratchet and a motor. The crank unit comprises a crankshaft and two crank arms. The two crank arms are respectively located at the two opposite ends of the crankshaft. The transmission unit comprises a first transmission wheel, a first relay wheel, a first transmission belt, a transmission shaft, a second relay wheel, a second transmission wheel and a second transmission belt. The first transmission wheel is fixedly mounted at one end of the crankshaft adjacent to one crank arm, enabling the first transmission wheel to be synchronized with the crankshaft. The first transmission belt connects the first transmission wheel and the first relay wheel, enabling the first transmission wheel to be synchronized with the first relay wheel. The transmission shaft is parallel to the crankshaft and coaxially connects the first relay wheel to the second relay wheel, enabling the first relay wheel to be synchronized with the second relay wheel. The second transmission belt connects the second transmission wheel to the second relay wheel, enabling the second transmission wheel to be synchronized with the second relay wheel. The one-way ratchet is mounted between the first relay wheel and the transmission shaft, enabling the power to be transmitted therebetween in one direction. The motor comprises a motor shaft. The motor shaft is connected to the second transmission wheel of the transmission unit so that the motor shaft of the motor and the second transmission wheel can be synchronized.

With the above design, when the motor is energized but not yet operated, the driving force applied by the user to the two crank arms drives the crankshaft to rotate together with the first transmission wheel. Then, the power is transmitted to the second transmission wheel via the first relay wheel, the one-way ratchet, the transmission shaft and the second relay wheel. In order for the second transmission wheel to drive the motor shaft of the motor to rotate in a first direction, the user's pedaling force needs to overcome the torque self-holding force generated by the motor. At this time, the motor is used as a resistance system. After the motor is started to rotate, the motor shaft of the motor drives the second transmission wheel to rotate. Then, the power is transmitted to the first transmission wheel via the second relay wheel, the transmission shaft, the one-way ratchet and the first relay wheel, causing the first transmission wheel to rotate the crankshaft and the two crank arms in a second direction reversed to the first direction. At this time, the motor is used as a power system, and the user's feet can apply a pressure to the two pedals to perform training.

Actually, the two-way transmission mechanism of the present invention integrates the manual drive mode and the electric drive mode, so that the user can switch according to actual needs, thereby achieving different training effects.

Preferably, the crankshaft or the motor shaft of the motor can be equipped with an inertia wheel according to actual needs, and the inertia of the inertia wheel further enhances the training effect and increases the comfort of the pedaling.

Preferably, the motor is electrically connected to a resistor, so that the resistor consumes the power generated by the motor in the resistance mode to avoid damage to the motor and other related electronic control systems.

Preferably, the transmission unit further has a guide wheel adjacent to the first relay wheel and abuts the first transmission belt and is mainly used to prevent the first transmission belt from being disengaged from the first relay under high torque transmission.

Other advantages and features of the present invention will be fully understood by reference to the following specification in conjunction with the accompanying drawings, in which like reference signs denote like components of structure.

DETAILED DESCRIPTION OF THE INVENTION

Figure 1:
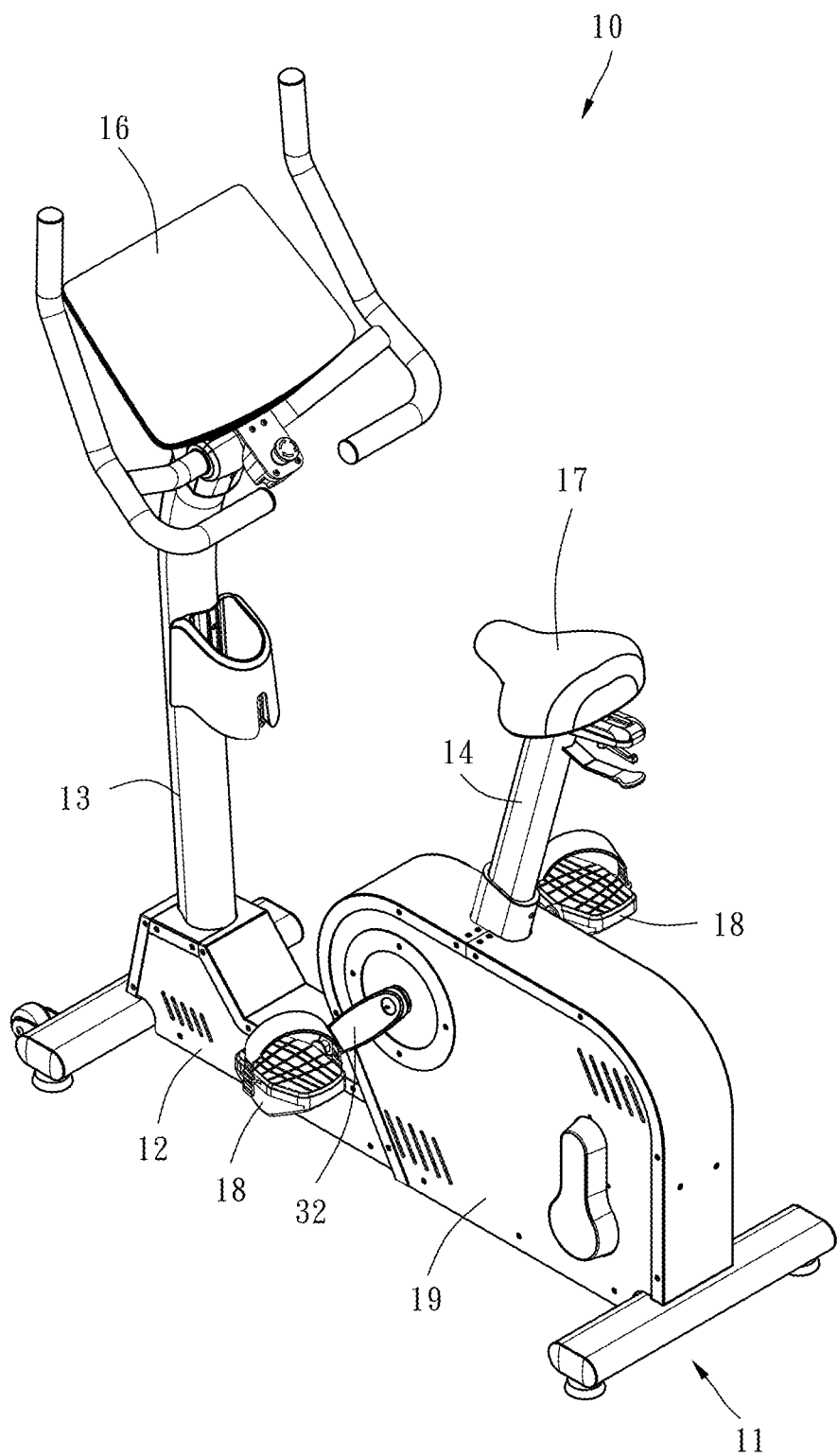
FIG. 1 is an oblique top elevational view of a vertical exercise bike embodying the present invention.

The Applicant first describes here, and in the entire specification, including the embodiments described below and the claims of the patent application, the directional terms are based on the directions in the drawings. Secondly, in the preferred embodiment and the drawings, the same reference numerals are used to refer to the same or similar elements or structural features thereof.

Figure 2:
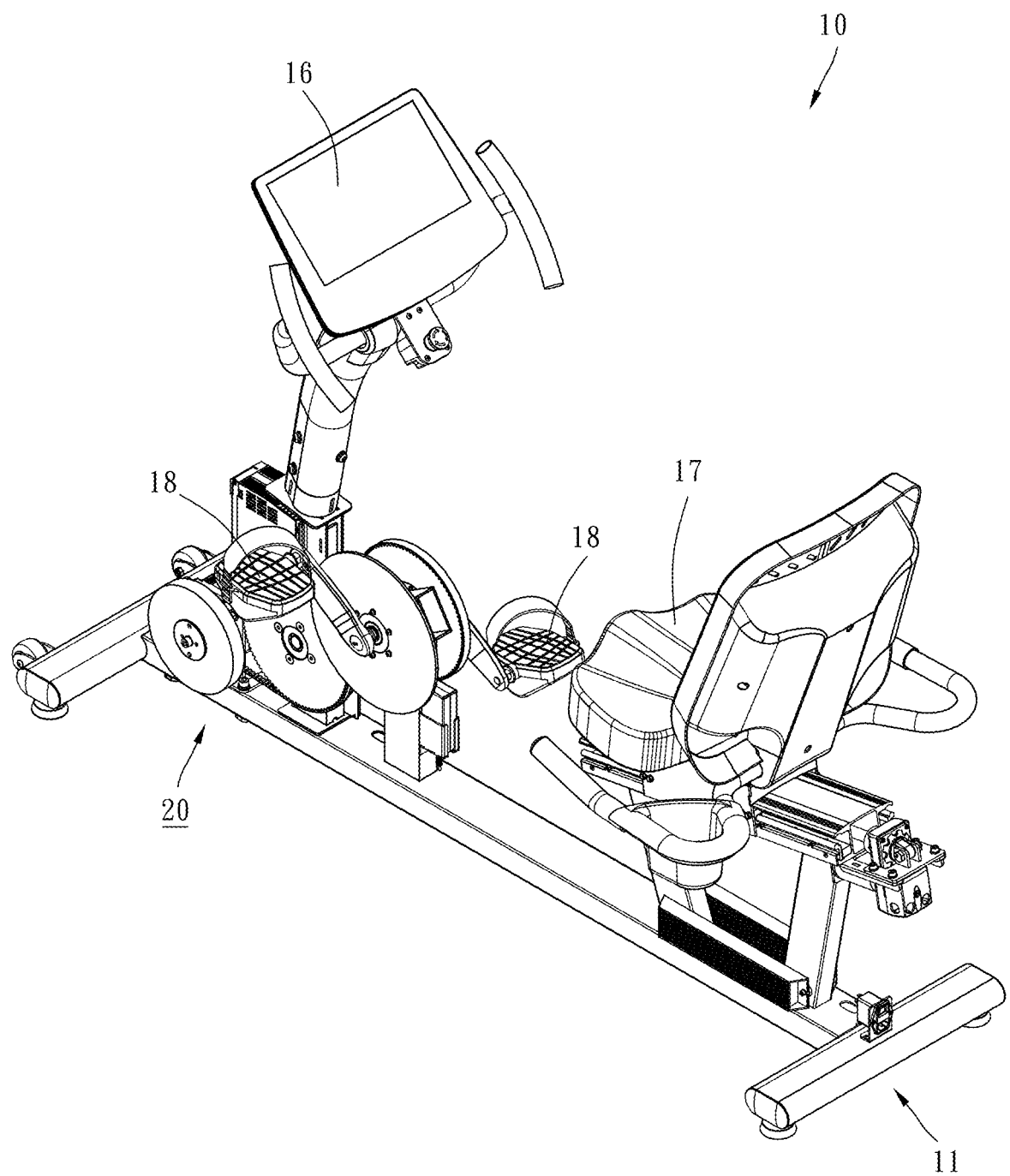
FIG. 2 is an oblique top elevational view of a horizontal exercise bike embodying the present invention.

Referring to FIG. 1, the fitness equipment 10 illustrated is a vertical exercise bike, comprising an equipment frame 11, an operation panel 16, a saddle 17, two pedals 18, a guard shell 19 and a two-way transmission mechanism 20. The equipment frame 11 comprises a base 12, an upright tube 13 and a seatpost 14. The upright tube 13 has a bottom end thereof affixed to a front end of the base 12, and an opposing top end thereof assembled with the operation panel 16. The guard shell 19 is fixedly fastened to a rear half of the base 12 to protect the two-way transmission mechanism 20. The seatpost 14 has a bottom end thereof inserted into the guard shell 19 and affixed to the center of the base 12, and an opposing top end thereof assembled with the saddle 17. It should be noted that the two-way transmission mechanism 20 provided by the present invention is not limited to use in the vertical exercise bike disclosed in FIG. 1 and can be applied to other different types of fitness equipment (for example, the horizontal exercise bike shown in FIG. 2).

Figure 3:
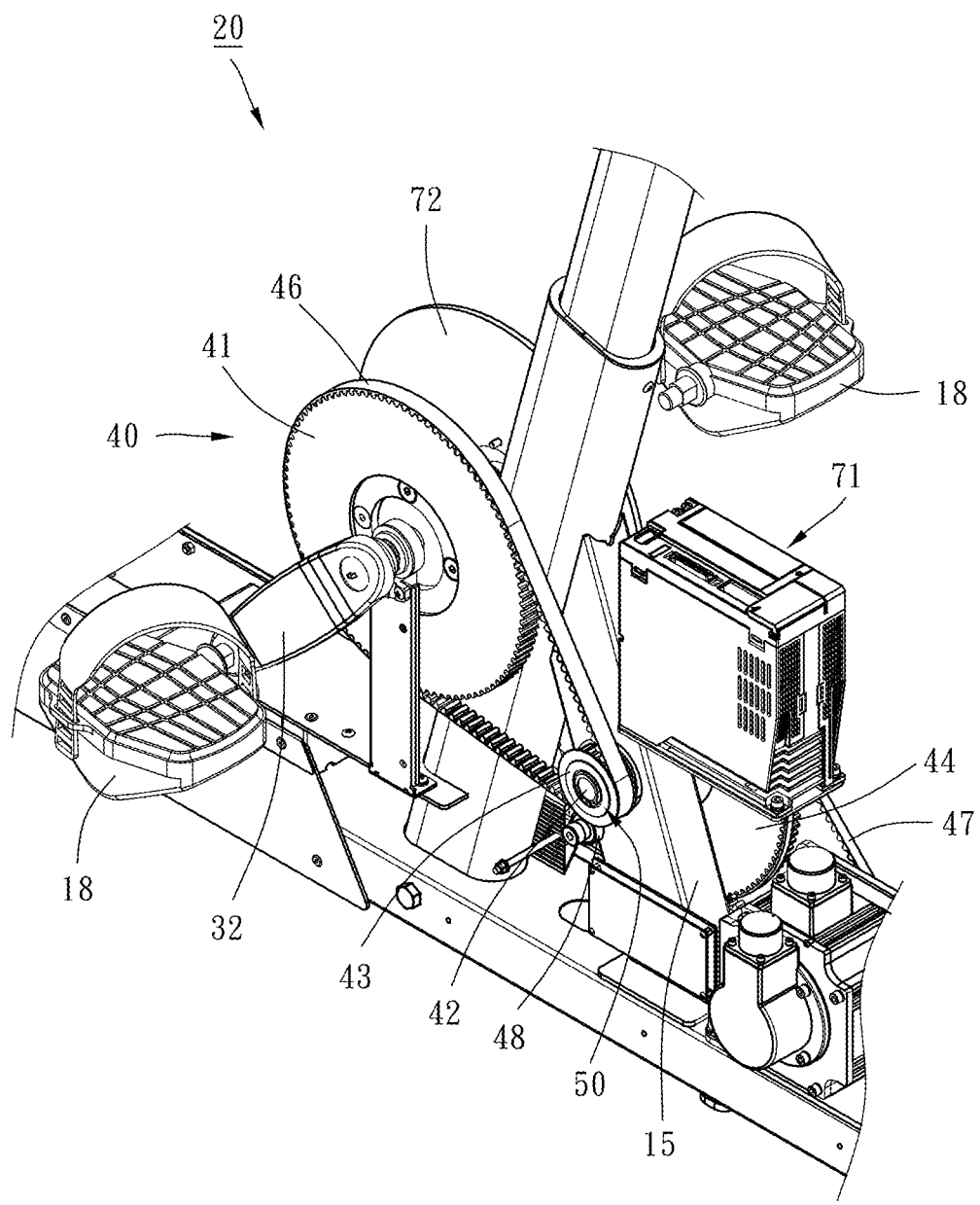
FIG. 3 is an oblique top elevational view of a two-way transmission mechanism in accordance with the present invention.
Figure 4:
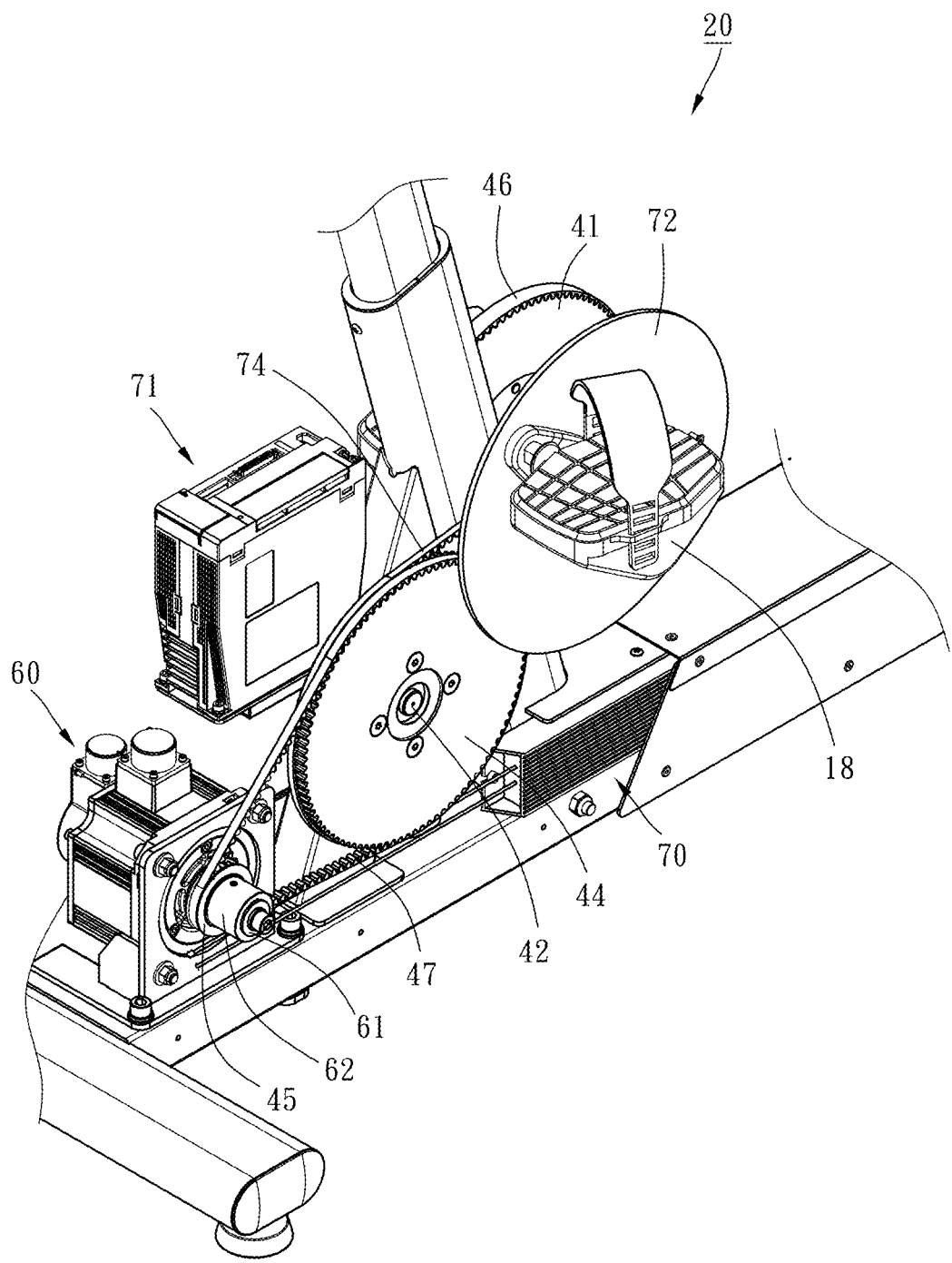
FIG. 4 corresponds to FIG. 3 when viewed in another angle.
Figure 7:
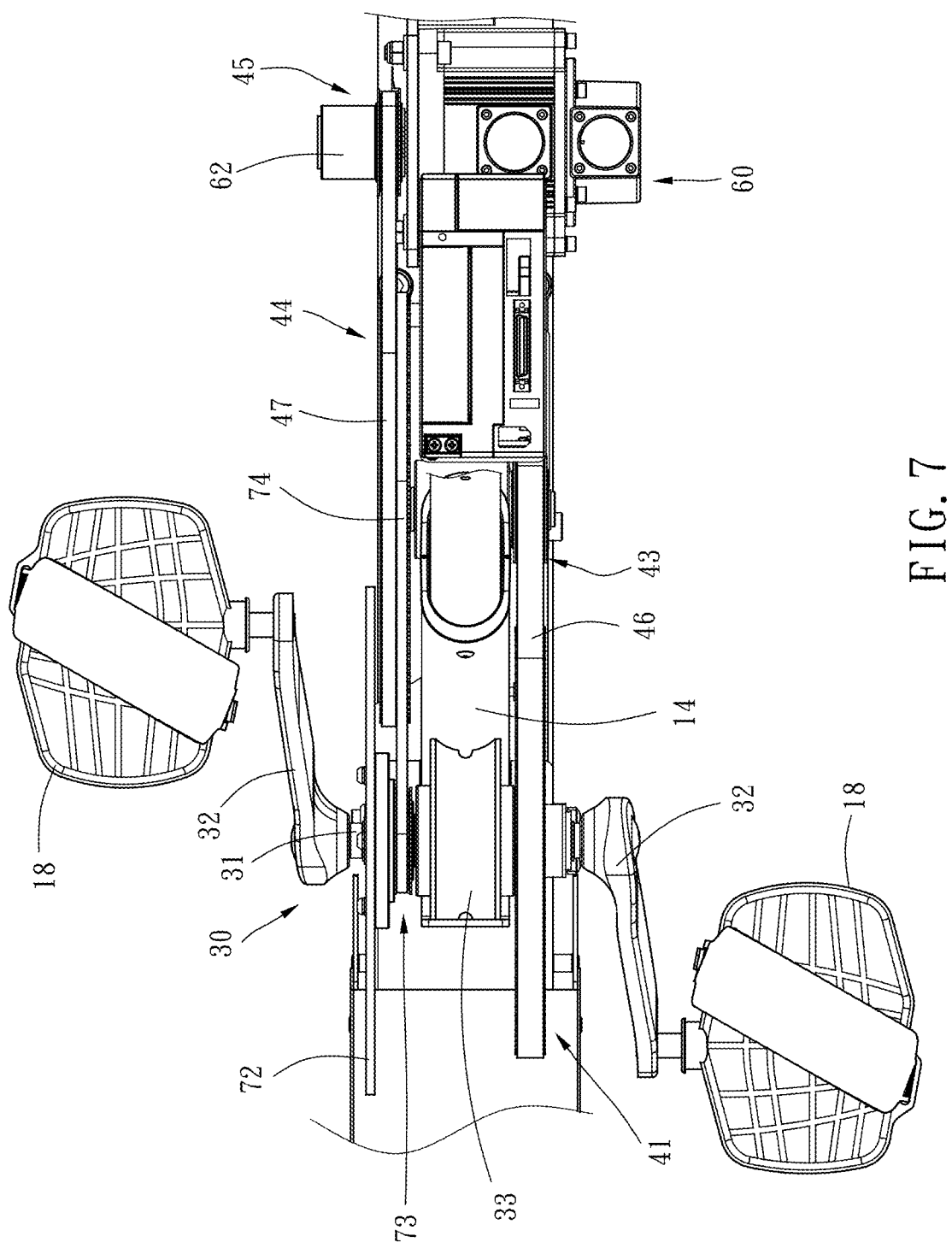
FIG. 7 is a top view of the two-way transmission mechanism in accordance with the present invention.

Referring to FIGS. 3, 4 and 7, the two-way transmission mechanism 20 provided by the present invention comprises a crank unit 30, a transmission unit 40, a one-way ratchet 50, and a motor 60.

The crank unit 30 comprises a crankshaft 31 and left and right crank arms 32. As shown in FIG. 7, the crankshaft 31 is rotatably disposed in a crankshaft bracket 33. The crankshaft bracket 33 is fixedly mounted to a front side of the seatpost 14. The two crank arms 32 are exposed to the outside of the guard shell 19, each having one end thereof affixed to respective one end of the crankshaft 31 and an opposite end thereof assembled with one respective pedal 18. In this way, the crankshaft 31, the two crank arms 32 and the two pedals 18 can be synchronized.

As illustrated in FIGS. 3 and 4, the transmission unit 40 comprises a first transmission wheel 41, a transmission shaft 42, a first relay wheel 43, a second relay wheel 44 and a second transmission wheel 45. In the present preferred embodiment, the first transmission wheel 41 is exemplified by a timing pulley but is not limited thereto. The first transmission wheel 41 is affixed to a left end of the crankshaft 31 and adjacent to the left-sided crank arm 32, so that the first transmission wheel 41 can be synchronized with the crankshaft 31. The transmission shaft 42 is rotatably disposed in a slanting bar 15 connected between the seatpost 14 and the base 12 and is parallel to the crankshaft 31. In the present preferred embodiment, the first and second relay wheels 43,44 are respectively exemplified by a timing pulley but are not limited thereto. The wheel diameter of the first relay wheel 43 is smaller than the wheel diameter of the second relay wheel 44. The first and second relay wheels 43,44 are respectively disposed at the left and right ends of the transmission shaft 42, wherein the first relay wheel 43 is connected to the first transmission wheel 41 by a first transmission belt 46 (in this embodiment, a timing belt is taken as an example, but not limited thereto) so that the first transmission wheel 41 can be synchronized with the first relay wheel 43; the second relay wheel 44 is connected to the second transmission wheel 45 by a second transmission belt 47 (in this embodiment, a timing belt is taken as an example, but not limited thereto) so that the second transmission wheel 44 can be synchronized with the second relay wheel 45.

It should be additionally noted that in order to prevent the first transmission belt 46 from being disengaged from the first relay wheel 43 under high torque transmission, the transmission unit 40 further provides a guide wheel 48. As illustrated in FIG. 3, the guide wheel 48 is adjacent to the first relay wheel 43 and abuts the first transmission belt 46 to increase the stability and smoothness of the first transmission belt 46 during operation.

Figure 5:
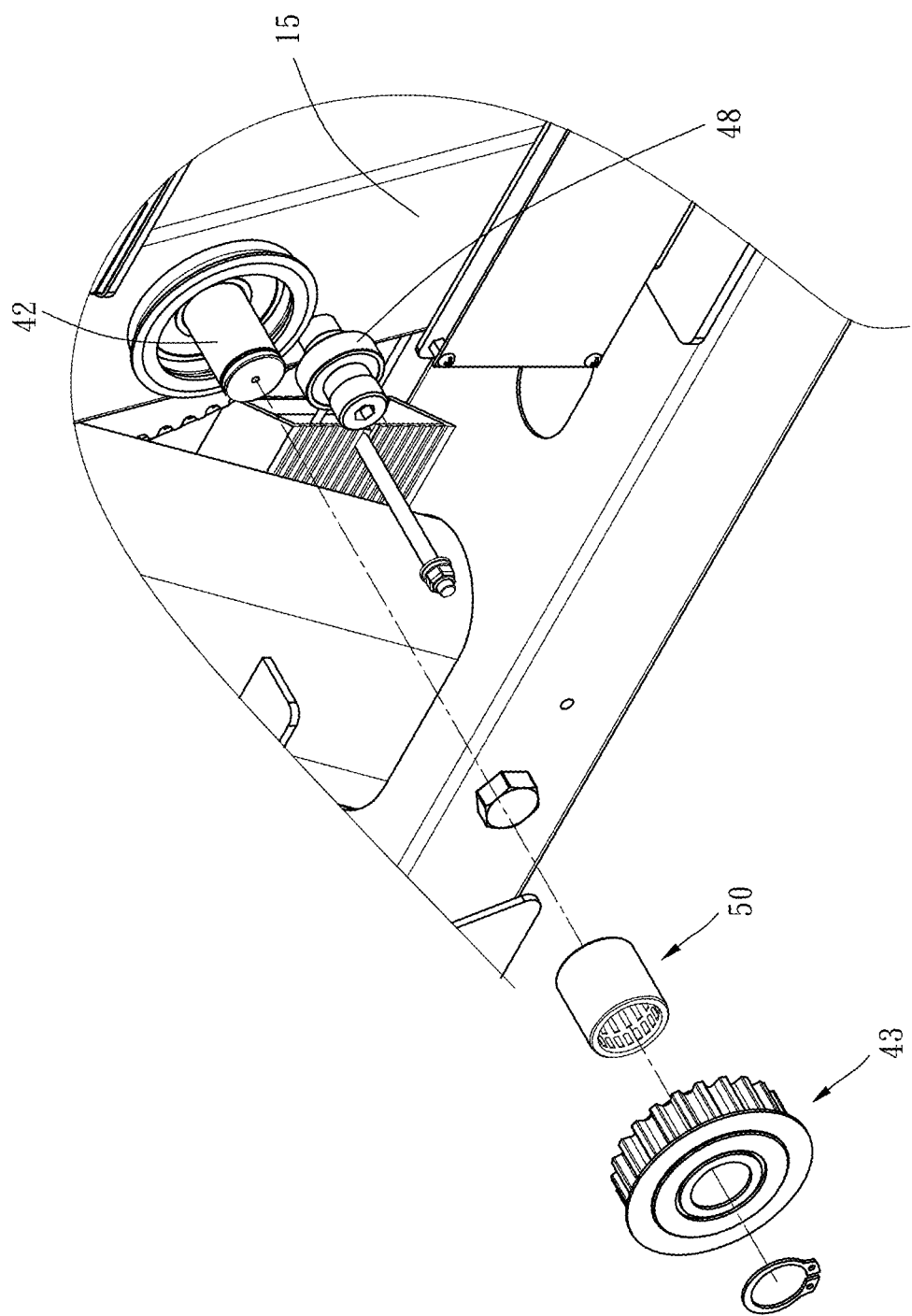
FIG. 5 is an exploded view of a part of the two-way transmission mechanism in accordance with the present invention.

The one-way ratchet 50 is provided between the first relay wheel 43 and the transmission shaft 42, as shown in FIG. 5, so that power can only be transmitted from the first relay wheel 43 to the transmission shaft 42 or from the transmission shaft 42 to the first relay wheel 43 in one direction.

Figure 6:
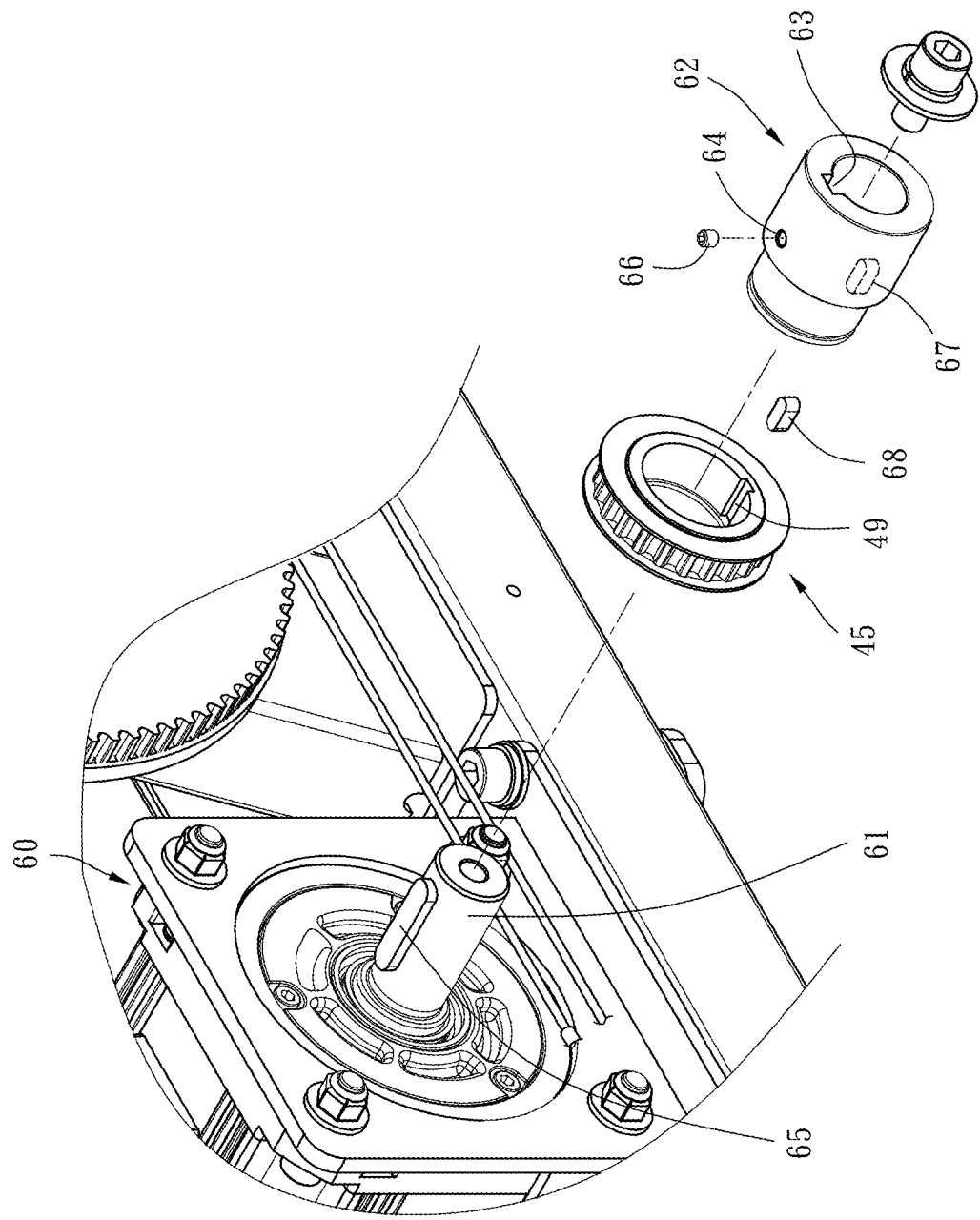
FIG. 6 is an exploded view of another part of the two-way transmission mechanism in accordance with the present invention.

The motor 60 here takes servo motor as an example, but this example is not a limitation. The motor 60 is mounted at the rear end of the base 12, comprising a motor shaft 61. The motor shaft 61 of the motor 60 is coaxially connected to the second transmission wheel 45 so that the motor shaft 61 of the motor 60 can be synchronized with the second transmission wheel 45. More specifically, as shown in FIG. 6, a sleeve 62 is disposed between the motor shaft 61 of the motor 60 and the second transmission wheel 45. The sleeve 62 has a recess 63 and a screw hole 64 radially in communication with the recess 63. The motor shaft 61 of the motor 60 has a convex portion 65. The sleeve 62 is sleeved on the motor shaft 61 and is engaged with the convex portion 65 of the motor shaft 61 by its recess 63. A screw 66 is threaded into the screw hole 64 and stopped against the convex portion 65 of the motor shaft 61 to lock the sleeve 62 to the motor shaft 61 of the motor 60. Further, the sleeve 62 has a first keyway 67. The second transmission wheel 45 has a second keyway 49. By means of mounting a key block 68 between the first keyway 67 and the second keyway 49, the sleeve 62 and the second transmission wheel 45 are locked together. Thereby, the motor shaft 61 of the motor 60 and the second transmission wheel 45 can be synchronized by the sleeve 62.

Figure 8:
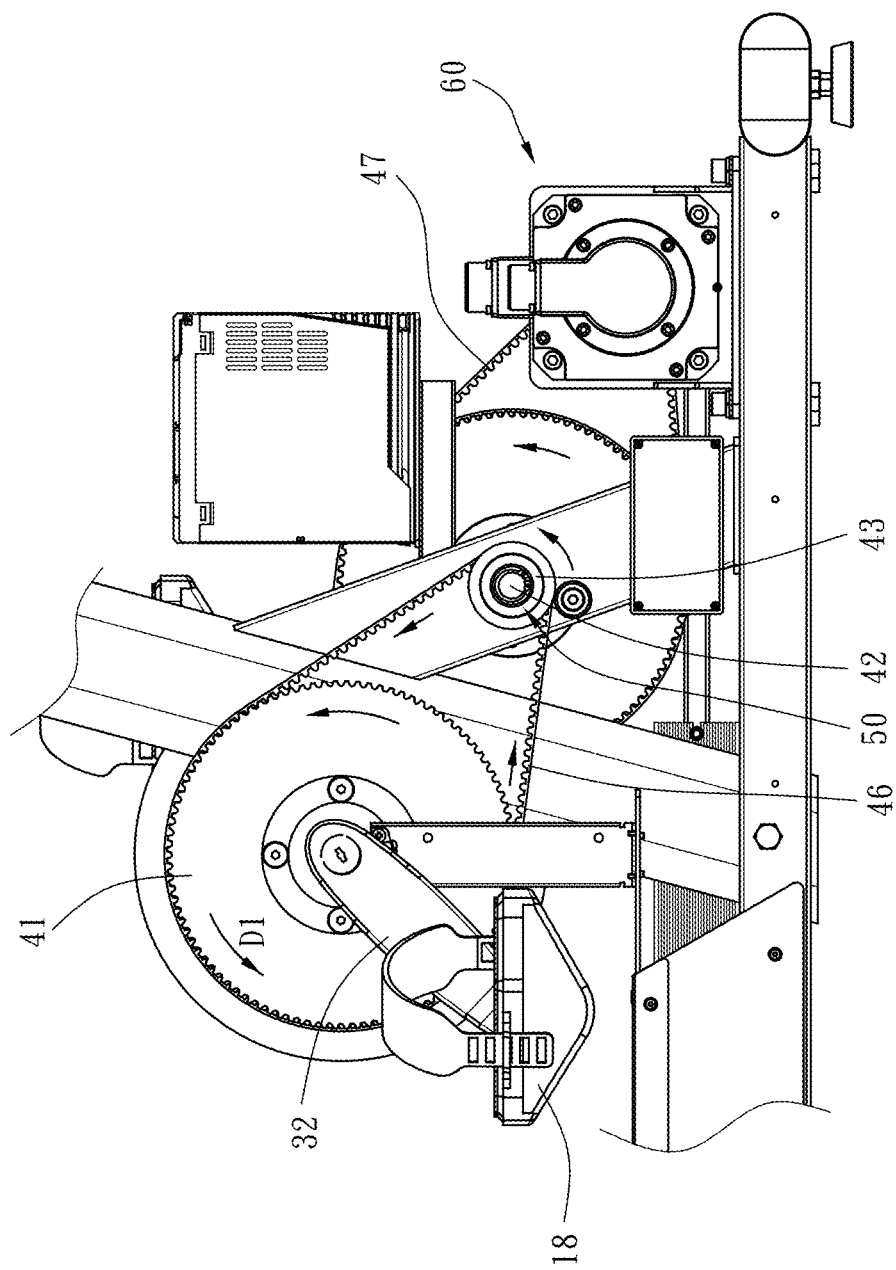
FIG. 8 is a left-side view of the two-way transmission mechanism in accordance with the present invention, illustrating the pedal forced forward.
Figure 9:
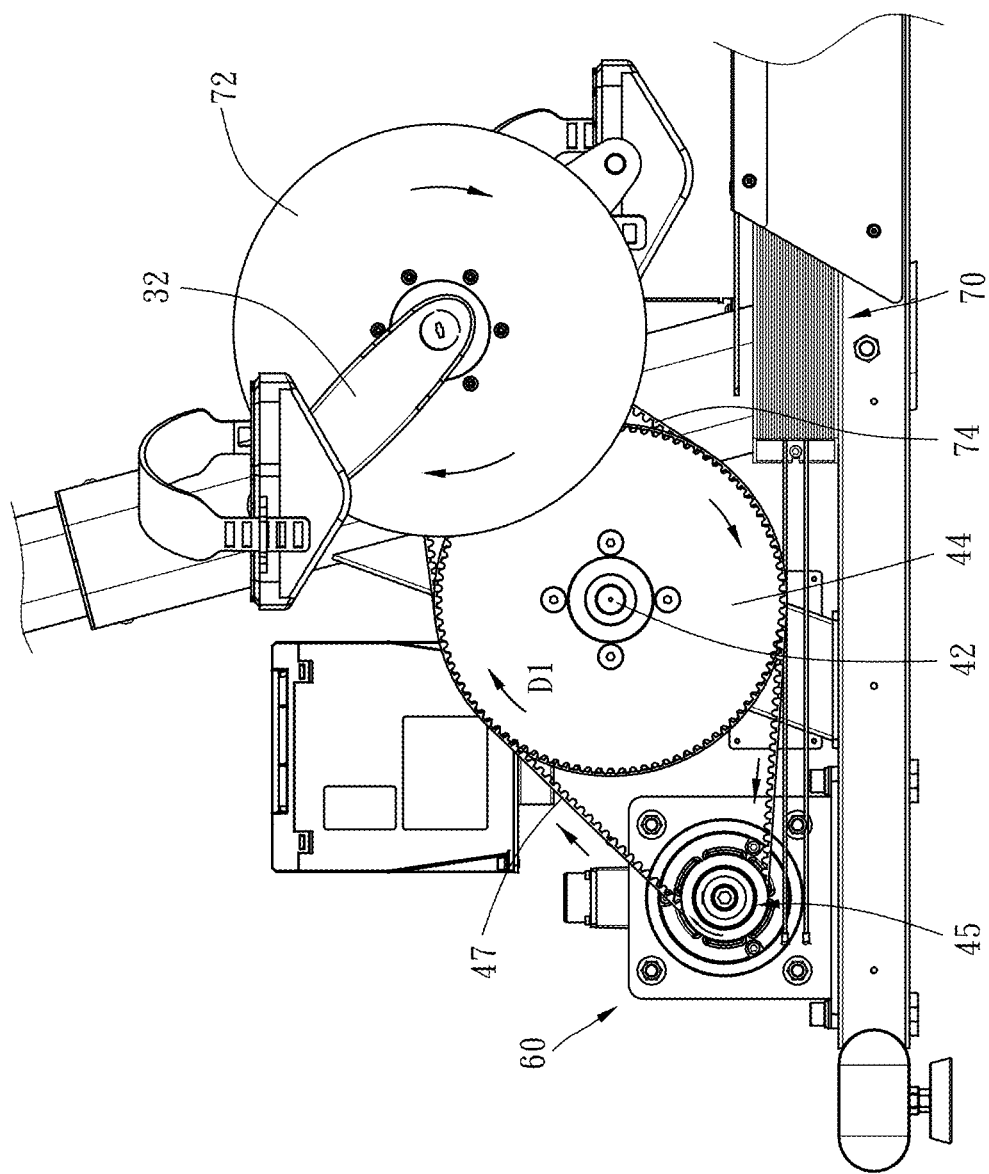
FIG. 9 is a right-side view of the two-way transmission mechanism in accordance with the present invention, illustrating the motor shaft of the motor rotated in the first direction.

As can be seen from the above, when the motor 60 is energized but not yet operated, as shown in FIGS. 8 and 9, the user steps on the two pedals 18 with both feet forward, and the two pedals 18 drive the crankshaft 31 via the two crank arms 32, causing rotation of the first transmission wheel 41 with the crankshaft 31 toward the first direction D1. The power is then transmitted to the motor shaft 61 of the motor 60 via the first transmission belt 46, the first relay wheel 43, the one-way ratchet 50, the transmission shaft 42, the second relay wheel 44, the second transmission belt 47 and the second transmission wheel 45. At this time, the pedaling force applied by the user needs to overcome the torque self-holding force of the motor 60, so that the motor shaft 61 of the motor 60 can be rotated together with the second transmission wheel 45 toward the first direction D1. In other words, the motor 60 is used as a resistance system at this time. In this mode, the power generated by the motor 60 is transferred to a resistor 70, which is used to dissipate the power generated by the motor 60 to avoid damage to the motor 60 and associated electronic control system. In addition, if the user steps on the two pedals 18 with both feet in this mode, the one-way ratchet 50 will function, so that the power cannot be transmitted from the first relay wheel 43 to the transmission shaft 42, and the transmission of the power to the motor shaft 61 of the motor 60 is interrupted.

Figure 10:
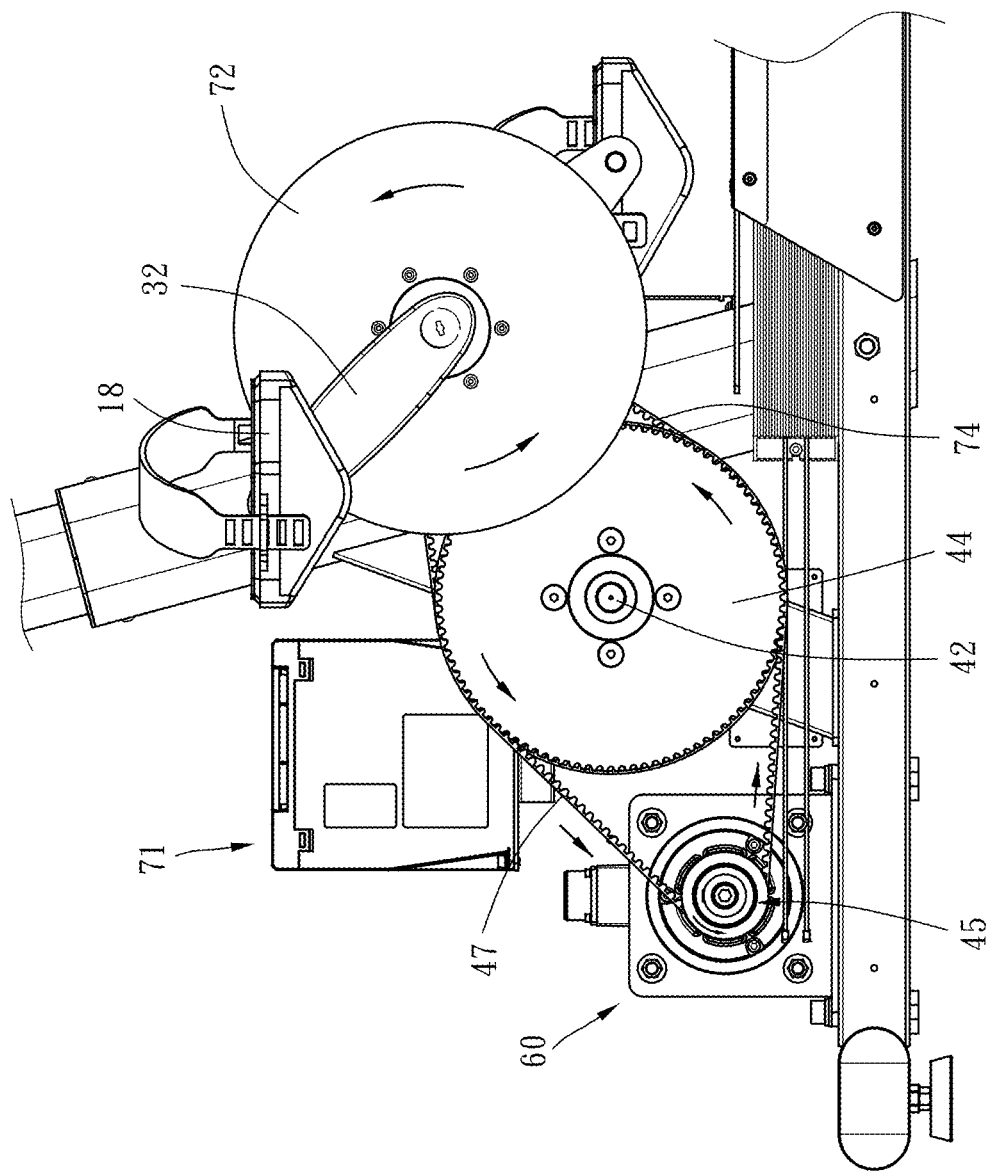
FIG. 10 is a right-side view of the two-way transmission mechanism in accordance with the present invention, illustrating the motor shaft of the motor rotated in the second direction.
Figure 11:
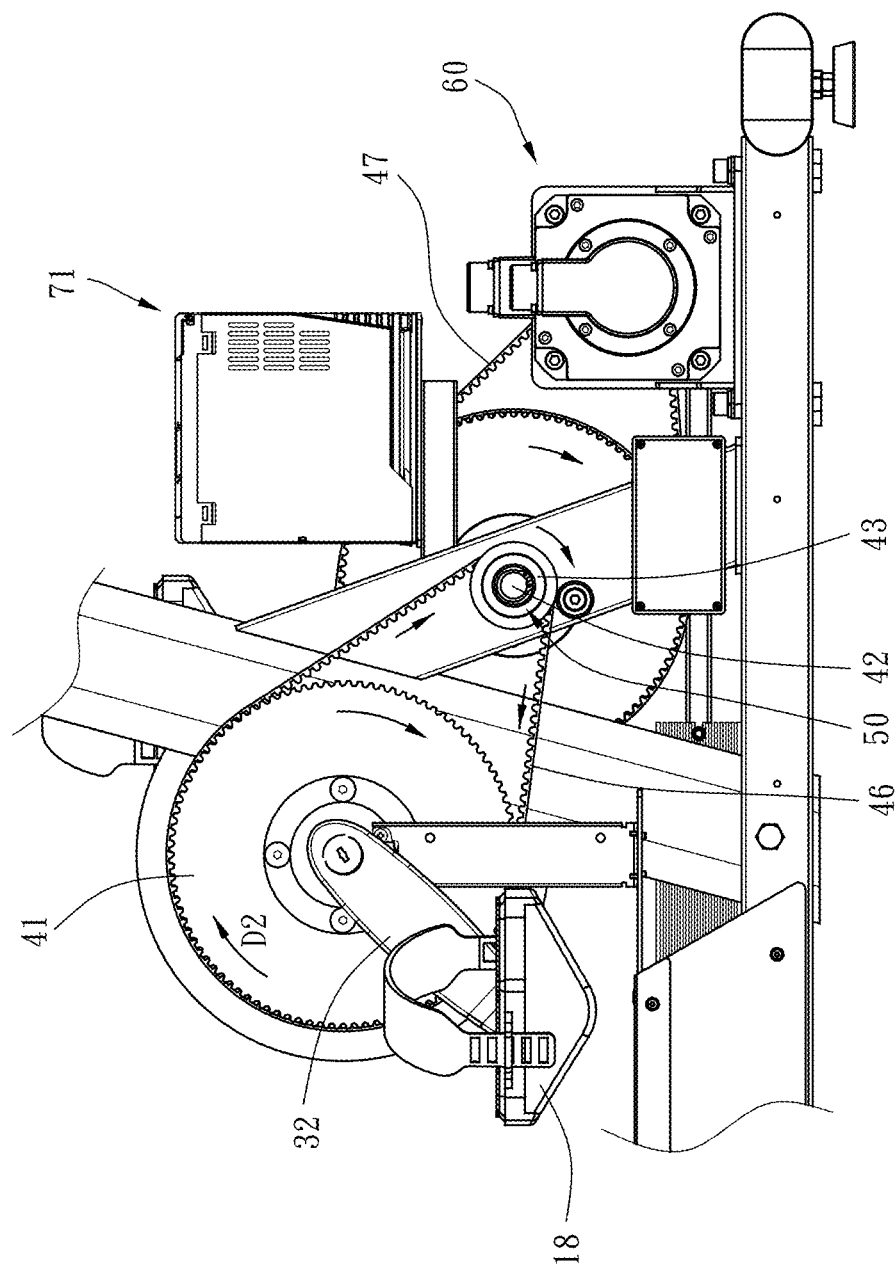
FIG. 11 is a left-side view of the two-way transmission mechanism in accordance with the present invention, illustrating the pedal reversed.

As shown in FIGS. 10 and 11, after the motor 60 is started to operate by the control of a controller 71, the motor shaft 61 of the motor 60 drives the second transmission wheel 45 to rotate in the second direction D2 opposite to the first direction D1. The power is then transmitted to the crankshaft 31 via the second transmission belt 47, the second relay wheel 44, the transmission shaft 42, the one-way ratchet 50, the first relay wheel 43, the first transmission belt 46 and the first transmission wheel 41, causing the crankshaft 31 to move the two crank arms 32 in driving the two pedals 18 to rotate in the second direction D2. At this time, the user's feet can be reversed with the two pedals 18. During reversing, the user's feet can apply a pressure to the two pedals 18 to perform training or rehabilitation.

On the other hand, an inertia wheel 72 can be added to the right end of the crankshaft 31. As shown in FIGS. 4 and 7, the inertial wheel 72 is coaxially connected to a third transmission wheel 73 (in this embodiment, a timing pulley is taken as an example but not a limitation). The third transmission wheel 73 is coupled to the second relay wheel 44 by a third transmission belt 74 (in the embodiment, a timing belt is taken as an example but not a limitation), so that the inertia wheel 72 is synchronized with the second relay wheel 44. Thus, regardless of the forward and reverse rotation, the inertia of the inertia wheel 72 can be utilized to further enhance the training effect and increase the comfort of the pedaling. However, in other embodiments, the inertia wheel 72 can be mounted on the motor shaft 61 of the motor 60 to provide the same effect.

In summary, the two-way transmission mechanism 20 of the present invention integrates the manual drive mode and the electric drive mode, so that the user can switch according to actual needs, thereby achieving different training effects.

What is claimed is:

1. A two-way transmission mechanism for fitness equipment, comprising:
    a crank unit comprising a crankshaft and two crank arms, said two crank arms being respectively located at two opposite ends of said crankshaft;
    a transmission unit comprising a first transmission wheel, a first relay wheel, a first transmission belt, a transmission shaft, a second relay wheel, a second transmission wheel and a second transmission belt, said first transmission wheel being fixedly mounted at one end of said crankshaft adjacent to one said crank arm, said first transmission belt connecting said first transmission wheel with said first relay wheel, said transmission shaft being parallel to said crankshaft and coaxially connecting said first relay wheel to said second relay wheel, said second transmission belt connecting said second transmission wheel with said second relay wheel;
    a one-way ratchet mounted between said first relay wheel and said transmission shaft; and
    a motor comprising a motor shaft, said motor shaft being connected to said second transmission wheel of said transmission unit for synchronization with said second transmission wheel;
    wherein when the crankshaft rotates in a first direction, causing rotation of the transmission unit and the motor with the crankshaft toward the first direction, the motor is in a resistance mode; when the motor shaft of the motor rotates in a second direction opposite to the first direction, the crank unit exerts a pressure in the first direction and the one-way ratchet will function, a power of the motor is then transmitted to the crankshaft via the second transmission belt, the second relay wheel, the transmission shaft, the one-way ratchet, the first relay wheel, the first transmission belt and the first transmission wheel, causing the crankshaft to move the two crank arms in driving the two pedals to rotate in the second direction.

2. The two-way transmission mechanism as claimed in claim 1, further comprising a sleeve mounted between said motor shaft of said motor and said second transmission wheel for enabling said second transmission wheel to be synchronized with said motor shaft of said motor.

3. The two-way transmission mechanism as claimed in claim 2, wherein said motor shaft of said motor comprises a convex portion on the periphery thereof; said sleeve comprises a recess engaged with said convex portion of said motor shaft of said motor, a screw hole radially disposed in communication with said recess, and a screw threaded into said screw hole and stopped against said convex portion of said motor shaft of said motor.

4. The two-way transmission mechanism as claimed in claim 2, wherein said sleeve comprises a first keyway; said second transmission wheel comprises a second keyway connected to said first keyway by a key block.

5. The two-way transmission mechanism as claimed in claim 1, wherein when said motor is energized before running, said motor shaft is drivable by said second transmission wheel to rotate in the first direction; when said motor starts to rotate, said motor shaft drives said second transmission wheel to rotate in the second direction reversed to said first direction.

6. The two-way transmission mechanism as claimed in claim 1, wherein said crankshaft has one end thereof mounted with an inertia wheel, said inertia wheel being coaxially connected with a third transmission wheel, said third transmission wheel being connected to said second relay wheel by a third transmission belt.

7. The two-way transmission mechanism as claimed in claim 1, wherein said motor shaft of said motor is coaxially connected with an inertial wheel.

8. The two-way transmission mechanism as claimed in claim 1, wherein said motor is electrically connected to a resistor.

9. The two-way transmission mechanism as claimed in claim 1, wherein said transmission unit further comprises a guide wheel disposed adjacent to said first relay wheel and abutted against said first transmission belt.

* * * * *